United States Patent
Naruse (10) Patent No.: US 11,491,980 B2
(45) Date of Patent: Nov. 8, 2022

(54) VEHICLE DRIVE SYSTEM

(71) Applicant: Toyota Jidosha Kabushiki Kaisha, Toyota (JP)

(72) Inventor: Tomohiro Naruse, Toyokawa (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 189 days.

(21) Appl. No.: 16/876,408

(22) Filed: May 18, 2020

(65) Prior Publication Data
US 2020/0391739 A1     Dec. 17, 2020

(30) Foreign Application Priority Data

Jun. 14, 2019    (JP) .............................. JP2019-110866

(51) Int. Cl.
| | |
|---|---|
| B60W 30/16 | (2020.01) |
| B60W 10/22 | (2006.01) |
| B60W 10/08 | (2006.01) |
| B60W 20/15 | (2016.01) |
| B60W 10/06 | (2006.01) |

(52) U.S. Cl.
CPC ............ *B60W 30/16* (2013.01); *B60W 10/08* (2013.01); *B60W 10/22* (2013.01); *B60W 10/06* (2013.01); *B60W 20/15* (2016.01); *B60W 2520/28* (2013.01)

(58) Field of Classification Search
CPC ...... B60W 30/16; B60W 10/08; B60W 10/22; B60W 20/15; B60W 10/06; B60W 2520/28; B60W 30/025; B60W 30/20; B60W 10/18
See application file for complete search history.

(56) References Cited

U.S. PATENT DOCUMENTS

| | | | |
|---|---|---|---|
| 2012/0065826 A1 | 3/2012 | Kinoshita et al. | |
| 2017/0001628 A1* | 1/2017 | Itagaki | B60W 10/08 |
| 2017/0066328 A1* | 3/2017 | Yoon | B60K 35/00 |
| 2017/0334426 A1* | 11/2017 | Kato | B60K 6/547 |
| 2018/0162349 A1* | 6/2018 | Chang | B60W 30/188 |
| 2019/0176801 A1* | 6/2019 | Ruybal | B60K 6/52 |
| 2020/0216058 A1* | 7/2020 | Aggoune | B60W 30/16 |
| 2021/0146914 A1* | 5/2021 | Takahara | B60W 10/18 |

FOREIGN PATENT DOCUMENTS

| | | |
|---|---|---|
| JP | 2009-127456 A | 6/2009 |
| WO | 2010131341 A1 | 11/2010 |

* cited by examiner

*Primary Examiner* — Tyler J Lee
*Assistant Examiner* — Yufeng Zhang
(74) *Attorney, Agent, or Firm* — Dinsmore & Shohl LLP (57) ABSTRACT

A vehicle drive system executes a basic drive force control in which a vehicle drive device applies, to an own vehicle, a drive force in accordance with a request of a driver, a first drive force changing control for changing the drive force applied in the basic drive force control, based on a variation in a wheel rotational speed, and a second drive force changing control for changing the drive force applied in the basic drive force control for a purpose different from a purpose of changing the drive force in the first drive force changing control. The first drive force changing control is configured such that a change amount of the drive force in the first drive force changing control is determined based on the wheel rotational speed from which is eliminated a variation in the wheel rotational speed caused by execution of the second drive force changing control.

6 Claims, 6 Drawing Sheets

VEHICLE DRIVE SYSTEM

CROSS REFERENCE TO RELATED APPLICATION

The present application claims priority to Japanese Patent Application No. 2019-110866, which was filed on Jun. 14, 2019, the disclosure of which is herein incorporated by reference in its entirety.

BACKGROUND

Technical Field

The following disclosure relates to a vehicle drive system installed on a vehicle and configured to apply a drive force to the vehicle.

Description of Related Art

A technique of changing, based on a wheel rotational speed, a drive force to be applied to a vehicle is known, for improving running performance and riding comfort of the vehicle. Specifically, there has been known a technique of damping a vibration of a body of the vehicle (hereinafter referred to as "sprung vibration" where appropriate) based on the wheel rotational speed, as disclosed in Patent Document 1 (WO 2010/131341), for instance.

SUMMARY

Here, a control of changing the drive force to be applied to the vehicle is referred to as a drive force changing control. In the case where at least two sorts of drive force changing controls are executed, one of the drive force changing controls may be adversely influenced by execution of the other of the drive force changing controls. Elimination of the influence caused by execution of the other of the drive force changing controls enables the one of the drive force changing controls to be appropriately executed, thus enhancing the utility of the vehicle drive system. Accordingly, one aspect of the present disclosure is directed to a vehicle drive system having high utility.

In one aspect of the present disclosure, a vehicle drive system is configured to execute a) a basic drive force control in which a vehicle drive device applies, to an own vehicle, a drive force in accordance with a request of a driver, b) a first drive force changing control for changing the drive force to be applied in the basic drive force control, based on a variation in a wheel rotational speed, and c) a second drive force changing control for changing the drive force to be applied in the basic drive force control for a purpose different from a purpose of changing the drive force in the first drive force changing control, wherein the first drive force changing control is configured such that a change amount of the drive force in the first drive force changing control is determined based on the wheel rotational speed from which is eliminated a variation in the wheel rotational speed caused by execution of the second drive force changing control.

The drive force is changed by execution of the second drive force changing control, and the wheel rotational speed accordingly varies by the change of the drive force. The first drive force changing control is configured to determine the change amount of the drive force based on the wheel rotational speed. Accordingly, execution of the second drive force changing control influences the first drive force changing control. The vehicle drive system of the present disclosure is configured such that the change amount of the drive force in the first drive force changing control is determined based on the wheel rotational speed from which is eliminated a variation in the wheel rotational speed caused by execution of the second drive force changing control, thus enabling execution of appropriate first drive force changing control. As a result, the vehicle drive system of the present disclosure has high utility.

Various Forms

The first drive force changing control and the second drive force changing control executed by the vehicle drive system of the present disclosure are not limited to any particular ones provided that each of the controls is configured to change, irrespective of a driver's request for the drive force, the drive force to be applied to the vehicle. For instance, the first drive force changing control may be a sprung-vibration damping control configured to change the drive force based on the variation in the wheel rotational speed for the purpose of damping a vibration of the body of the vehicle that arises from road input such as unevenness or irregularities of the road surface. Further, the second drive force changing control may be a preceding-vehicle following control configured to change the drive force so as to enable an own vehicle to follow a preceding vehicle running ahead of the own vehicle while a distance between the preceding vehicle and the own vehicle, i.e., a following distance, is kept at a set distance. Moreover, the second drive force changing control may be a sharing load ratio changing control executed in turning that is configured to change, in turning of the own vehicle, the drive force so as to change a ratio between a load of the body of the vehicle shared (received) by front wheels and a load of the body of the vehicle shared (received) by rear wheels. These configurations enable the sprung-vibration damping control to be executed while the influence of the variation in the wheel rotational speed that is caused by execution of the preceding-vehicle following control and/or the sharing load ratio changing control is eliminated.

The "drive force" in the present disclosure is not necessarily limited to a force for causing the vehicle to advance or for increasing a running speed of the vehicle. (This force will be hereinafter referred to as "propelling force" where appropriate.) The drive force may be a negative drive force to be applied to the vehicle for deceleration, i.e., a braking force. In the case where the vehicle drive device configured to apply the drive force to the vehicle by the basic drive force control includes an electric motor as a drive source as in an electric vehicle or includes an electric motor and an engine as a drive source as in a hybrid vehicle, regeneration by the electric motor as the drive source can be utilized so that the vehicle drive device can generate a braking force based on regeneration by the electric motor. When a certain propelling force, which is being applied as the drive force to the vehicle, is decreased, it may be construed that the braking force corresponding to the decrease in the propelling force is applied to the vehicle.

When the first drive force changing control and the second drive force changing control are simultaneously executed in addition to the basic drive force control, the change amount of the drive force determined by the first drive force changing control and the change amount of the drive force determined by the second drive force changing control are added to the drive force determined by the basic drive force control, so as to determine the drive force to be applied to the own vehicle.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION

Referring to the drawings, there will be explained below in detail a vehicle drive system according to one embodiment of the present disclosure. It is to be understood that the present disclosure is not limited to the details of the following embodiment but may be embodied based on the forms described in Various Forms and may be changed and modified based on the knowledge of those skilled in the art.

A. Structure of Vehicle on Which Vehicle Drive System is Installed

Figure 1:
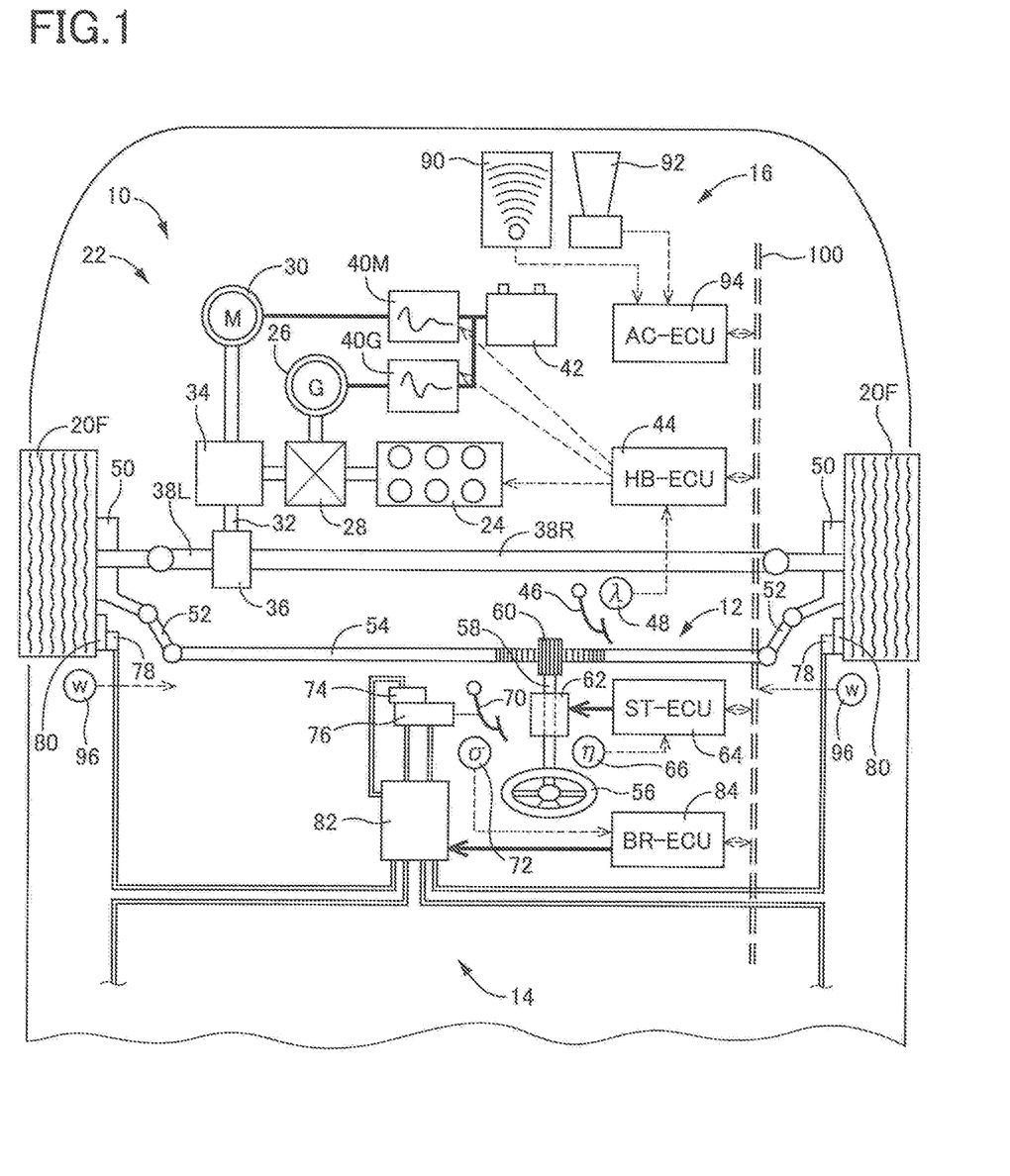
FIG. 1 is a schematic view of a hardware structure of a vehicle on which a vehicle drive system according to one embodiment is installed.

As illustrated in FIG. 1, a vehicle is equipped with: a vehicle drive system 10 according to one embodiment; a vehicle steering system 12; a vehicle brake system 14; and a vehicle automatic following system 16 for enabling an own vehicle to automatically follow a preceding vehicle running ahead of the own vehicle. Each of these systems 10, 12, 14, 16 has an ordinary structure except for a part thereof relating to a part of controls that will be explained. There will be hereinafter briefly explained a hardware structure of each of the systems 10, 12, 14, 16 and an ordinary control executed in each of the systems 10, 12, 14, 16.

i) Vehicle Drive System

As illustrated in FIG. 1, the vehicle equipped with the vehicle drive system 10 according to the embodiment has front right and left wheels 20F each of which is a drive wheel and a steerable wheel. The vehicle drive system 10 is what is called hybrid drive system including a vehicle drive device 22 for driving the front wheels 20F. Specifically, the vehicle drive device 22 includes an engine 24 as a drive source, a generator 26 functioning mainly as an electric generator, a power distribution mechanism 28 to which the engine 24 and the generator 26 are coupled, and an electric motor 30 as another drive source.

The power distribution mechanism 28 is constituted principally by a planetary gear mechanism and has a function of distributing rotation of the engine 24 to rotation of the generator 26 and rotation of the output shaft 32. The electric motor 30 is coupled to an output shaft 32 via a reduction mechanism 34 functioning as a speed reducer. Rotation of the output shaft 32 is transmitted to the front right and left wheels 20F via a differential mechanism 36 and respective drive shafts 38L, 38R so that the front right and left wheels 20F are drivingly rotated. The generator 26 is coupled to a battery 42 via an inverter 40G. Electric energy obtained by electric power generation of the generator 26 is stored in the battery 42. The electric motor 30 is also coupled to the battery 42 via an inverter 40M.

The electric motor 30 and the generator 26 are controlled by controlling the inverter 40M and the inverter 40G, respectively. Management of a charged amount of the battery 42, control of the engine 24 (i.e., control of a throttle valve), and control of the inverter 40M and the inverter 40G are executed by a hybrid electronic control unit 44 that includes a computer, drive circuits (drivers) for devices of the vehicle drive system 10, etc. The hybrid electronic control unit 44 will be hereinafter referred to as "HB-ECU 44" where appropriate as illustrated in FIG. 1. The HB-ECU 44 functions as a controller of the vehicle drive system 10.

The vehicle drive system 10 includes an accelerator pedal 46 that is an accelerator operating member operated by a driver and an accelerator operation amount sensor 48 for detecting an operation amount of the accelerator pedal 46. The HB-ECU 44 executes a basic drive force control that will be explained in detail, namely, control for causing the vehicle drive device 22 to generate a drive force corresponding to the operation amount of the accelerator pedal 46 detected by the accelerator operation amount sensor 48.

The vehicle drive device 22 can apply, to the vehicle, not only a positive drive force, i.e., a propelling force, but also a negative drive force, i.e., a braking force. Specifically, the vehicle drive device 22 can generate a braking force by electric power generation of the generator 26 and the electric motor 30, namely, a regenerative braking force. Thus, the vehicle drive device 22 functions also as a regenerative brake device. When the braking force required for the vehicle as a whole (hereinafter referred to as "required overall braking force" where appropriate) is applied to the vehicle, the regenerative braking force is generated with a higher priority in principle except for a fully charged state or almost fully charged state of the battery 42. A shortage in the required overall braking force that cannot be covered by the regenerative braking force is covered by a hydraulic braking force generated by a vehicle brake system 14 constituted mainly by a hydraulic brake device.

ii) Vehicle Steering System

The vehicle steering system 12 has an ordinary structure. The vehicle steering system 12 includes a pair of steering knuckles 50 that respectively hold the right and front wheels 20F, a steering rod (which may be referred to as a rack bar) 54 whose opposite ends are coupled to the respective steering knuckles 50 via respective link rods 52, a steering wheel 56 that is a steering operation member, a steering shaft 58 coupled to the steering wheel 56, a motion converting mechanism 60 for converting a rotating motion of the steering shaft 58 into a leftward and rightward movement of the steering rod 54, and an assist device 62 configured to assist a steering force exerted by the driver. The motion converting mechanism 60 is constituted by a rack and pinion mechanism including a rack formed on the steering rod 54 and a pinion coupled to the steering shaft 58 and meshing with the rack. The assist device 62 includes an electric motor and configured to apply, to the steering shaft 58, a force generated by the electric motor.

In the vehicle steering system 12, control of an assist force by the assist device 62, namely, steering assist control, is executed by a steering electronic control unit 64 that includes a computer, a drive circuit of the electric motor of the assist device 62, etc. The steering electronic control unit 64 will be hereinafter referred to as "ST-ECU 64" where appropriate as illustrated in FIG. 1. The assist device 62 includes an operation force sensor for detecting an operation force applied by the driver to the steering wheel 56 by measuring twisting of the steering shaft 58. Based on the detected operation force, the ST-ECU 64 supplies an electric power to the electric motor of the assist device 62 such that the assist force whose magnitude corresponds to a magnitude of the operation force is applied to the steering shaft 58.

As later explained in detail, the ST-ECU 64 executes a part of a sharing load ratio changing control executed in turning (hereinafter simply referred to as "sharing load ratio changing control" where appropriate). For execution of the sharing load ratio changing control, the vehicle steering system 12 includes a steering angle sensor 66 for detecting an operation amount of the steering wheel 56, namely, for detecting a steering angle. The steering angle sensor 66 is coupled to the ST-ECU 64.

iii) Vehicle Brake System

The vehicle brake system 14 is a hydraulic disc brake system. The vehicle brake system 14 includes: a brake pedal 70 that is a brake operation member; a brake operation amount sensor 72 for detecting, as a brake operation amount, an operation amount of the brake pedal 70; a master cylinder 76 to which the reservoir 74 is attached and which is coupled to the brake pedal 70; brake calipers 80 which are provided respectively for the front wheels 20F and rear wheels 20R (not illustrated in FIG. 1) and each of which includes a wheel cylinder 78; and a brake actuator 82 configured to receive a working fluid in the master cylinder 76 and to supply the working fluid to the wheel cylinder 78 of each of the front wheels 20F and the rear wheels 20R.

The brake actuator 82 incorporates a hydraulic circuit including an electric pump and electromagnetic valves. The brake actuator 82 normally supplies the pressurized working fluid to each wheel cylinder 78 without receiving the working fluid from the master cylinder 76. Thus, the vehicle brake system 14 is a system in which is generated the braking force that does not rely on a force applied by the driver to the brake pedal 70, namely, the vehicle brake system 14 is what is called brake-by-wire system. The braking force to be applied to each of the front wheels 20F and the rear wheels 20R is controlled by a brake electronic control unit 84 that includes a computer, a drive circuit of the electric pump and the electromagnetic valves of the brake actuator 82, etc. The brake electronic control unit 84 will be hereinafter referred to as "BR-ECU 84" where appropriate as illustrated in FIG. 1. The BR-ECU 84 controls the brake actuator 82 based on the brake operation amount detected by the brake operation amount sensor 72, so as to apply the braking force corresponding to the brake operation amount, namely, the braking force whose magnitude corresponds to a braking force request made by the driver. Specifically, as explained above, the shortage in the required overall braking force that cannot be covered by the regenerative braking force is covered by the braking force generated by the vehicle brake system 14, and the thus generated braking force is applied to each of the front wheels 20F and the rear wheels 20R.

iv) Vehicle Automatic Following System

The vehicle automatic following system 16 is a system for enabling the vehicle (own vehicle) to follow a preceding vehicle that is running ahead of the own vehicle with a set distance interposed therebetween. The distance between the own vehicle and the preceding vehicle will be hereinafter referred to as "following distance" where appropriate. The vehicle automatic following system 16 includes radar 90 and a camera 92 disposed at a front portion of the vehicle, a vehicle automatic following electronic control unit 94 that includes a computer as a main constituent element, etc. The vehicle automatic following electronic control unit 94 will be hereinafter referred to as "AC-ECU 94" where appropriate as illustrated in FIG. 1. In this respect, the vehicle is equipped with wheel speed sensors 96 respectively provided for the front wheels 20F. Each of the wheel speed sensors 96 is for detecting a wheel rotational speed of the corresponding front wheel 20F for the purpose of identifying a running speed of the own vehicle.

The AC-ECU 94 identifies a forward object (including the preceding vehicle) that exists ahead of the own vehicle based on information obtained by the radar 90 and data of images taken by the camera 92, so as to identify a distance between the forward object and the own vehicle (that may be referred to as the following distance) and a relative speed of the forward object and the own vehicle. Further, the AC-ECU 94 identifies the running speed of the own vehicle based on the wheel rotational speeds detected by the respective wheel speed sensors 96 provided for the respective front wheels 20F.

In the case where the forward object is the preceding vehicle, the AC-ECU 94 executes a part of preceding-vehicle following control (that will be later explained in detail) based on the following distance and the relative speed identified above. Further, the AC-ECU 94 judges the probability of collision of the own vehicle with the forward object. When the probability of collision becomes high to some extent, the AC-ECU 94 issues, to the vehicle brake system 14, a command for applying an emergency braking force to the own vehicle, as a part of collision avoidance control.

B. Controls Relating to Vehicle Drive System

In the present vehicle, the following three sorts of controls are executed in relation to the vehicle drive system: a basic drive force control; a first drive force changing control for changing the drive force to be applied in the basic drive force control; and a second drive force changing control for changing the drive force to be applied in the basic drive force control for a purpose different from a purpose of changing the drive force in the first drive force changing control. Specifically, the first drive force changing control is a sprung-vibration damping control executed for damping a vibration of the vehicle body that arises from road input such as unevenness or irregularities of the road surface. The second drive force changing control includes: the preceding-vehicle following control for enabling the own vehicle to follow the preceding vehicle while the distance between the own vehicle and the preceding vehicle, i.e., the following distance, is kept at a set distance; and the sharing load ratio changing control for changing, in turning of the own vehicle, a ratio between a load of the vehicle body shared by the front wheels 20F and a load of the vehicle body shared by the rear wheels 20R. The controls described above will be hereinafter explained in detail. There will be further explained:

determination of the drive force that should be applied by the vehicle drive device 22 when the controls are executed simultaneously; a flow which relates to determination of the drive force and the braking force to be applied to the vehicle, the determination including the above-indicated determination of the drive force that should be applied when the controls are executed simultaneously; elimination of the influence by the second drive force changing control in the sprung-vibration damping control that is the first drive force changing control; and functions of the HB-ECU 44 relating to the controls. The HB-ECU 44, the ST-ECU 64, the BR-ECU 84, and the AC-ECU 94 perform information communication with one another so as to execute the controls. To this end, the ECUs 44, 64, 84, 94 are connected to a controllable area network or car area network (CAN) 100.

i) Basic Drive Force Control

The basic drive force control is executed by the HB-ECU 44 to apply, to the vehicle, the drive force based on the driver's request. The HB-ECU 44 obtains an accelerator operation amount λ of the accelerator pedal 46 detected by the accelerator operation amount sensor 48 and determines, based on the accelerator operation amount λ, a basic drive force that should be applied to the front wheels 20F by the vehicle drive device 22. The basic drive force is determined as a drive torque to be applied to the output shaft 32, namely, a basic drive torque $T_B$. Similarly, change amounts of the drive force (which will be later explained) are determined as change amounts of the drive torque to be applied to the output shaft 32.

ii) Sprung-Vibration Damping Control

The vehicle drive system 10 is configured to change the drive force to be applied to the front wheels 20F by the vehicle drive device 22, so as to execute the sprung-vibration damping control for damping the vibration of the vehicle body that arises from unevenness or irregularities of the road surface on which the vehicle travels or the like. Specifically, the sprung-vibration damping control is for damping a bounce vibration and a pitch vibration of the vehicle body in a sprung resonance frequency range. The sprung-vibration damping control is executed by the HB-ECU 44. The HB-ECU 44 determines a sprung-vibration damping component $T_V$ as the change amount of the drive force in the sprung-vibration damping control.

Figure 2A:
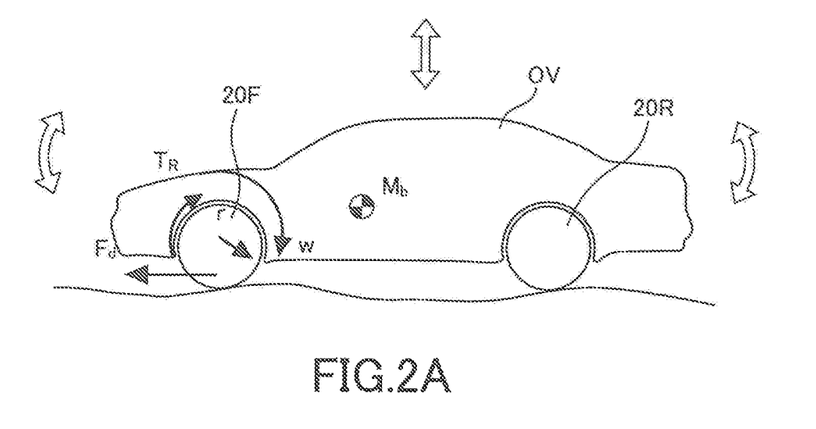
FIG. 2A is a schematic view for explaining a sprung-vibration damping control for damping a bounce vibration and a pitch vibration of a body of the vehicle by changing a drive force to be applied to the vehicle.
Figure 2B:
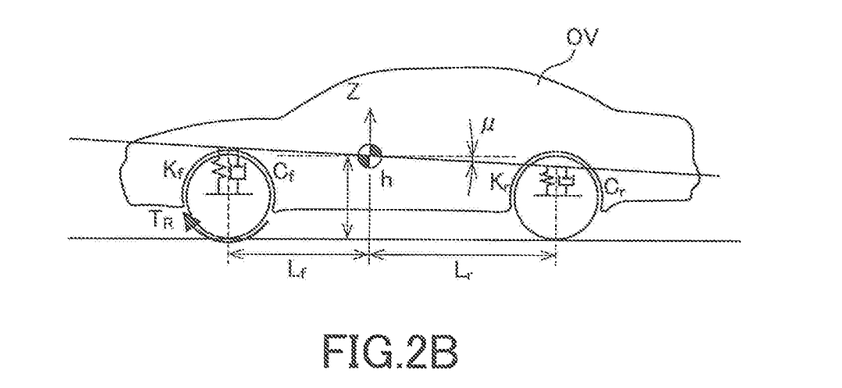
FIG. 2B is another schematic view for explaining the sprung-vibration damping control for damping the bounce vibration and the pitch vibration of the body of the vehicle by changing the drive force to be applied to the vehicle.

The sprung-vibration damping component $T_V$ is determined according to a known process, and the process will be briefly explained referring to FIG. 2. In determining the sprung-vibration damping component $T_V$, a resonance frequency wheel speed component w' is extracted based on the wheel rotational speeds w of the front wheels 20F obtained by detection by the corresponding wheel speed sensors 96. The resonance frequency wheel speed component w' is a change component of the wheel rotational speeds w in a sprung resonance frequency range (e.g., about 1.5 Hz). Based on the extracted resonance frequency wheel speed component w', a road-surface-dependent torque $T_R$ is estimated. The road-surface-dependent torque $T_R$ is a torque that acts on the front wheels 20F from the road surface and thereby causes the vibration of the vehicle body. Specifically, the road-surface-dependent torque $T_R$ is estimated according to a single-degree-of-freedom model illustrated in FIG. 2A based on: the extracted resonance frequency wheel speed component w' in the own vehicle OV; a contact-position drive force $F_d$ that is a drive force acting on the own vehicle OV at contact positions of the respective front wheels 20F with the road surface; a wheel radius r; and a body mass $M_b$ of the own vehicle OV. The contact-position drive force $F_d$ is estimated based on: vehicle acceleration G estimated based on rotational acceleration dw/dt of the front wheels 20F and the wheel radius r; the wheel radius r; and the body mass $M_b$.

Based on the estimated road-surface-dependent torque $T_R$, a condition of the vehicle relating to a bounce behavior and a pitch behavior of the vehicle body is estimated as a vehicle condition. Specifically, a vehicle condition index X indicative of the vehicle condition is estimated. The vehicle condition index X is estimated according to a two-degree-of-freedom model illustrated in FIG. 2B based on: the road-surface-dependent torque $T_R$; a height h of the gravitational center of the vehicle body; a horizontal distance $L_f$ between the gravitational center of the vehicle body and the axis of the front wheels 20F and a horizontal distance $L_r$ between the gravitational center of the vehicle body and the axis of the rear wheels 20R; a spring constant $K_f$ of suspension springs on the front-wheel side and a spring constant $K_r$ of suspension springs on the rear-wheel side; and a damping coefficient $C_f$ of absorbers on the front-wheel side and a damping coefficient $C_r$ of absorbers on the rear-wheel side. The vehicle condition index X is estimated as a condition amount represented by X (z, dz/dt, μ, dμ/dt) that may be regarded as a function using, each as a parameter, a bounce amount z of the vehicle body, a bounce speed dz/dt, a pitch angle μ of the vehicle body, and a pitch speed dμ/dt. Based on the estimated vehicle condition index X, the HB-ECU 44 determines, as the sprung-vibration damping component $T_V$, the drive torque that suppresses the pitch behavior and the bounce behavior.

iii) Preceding-Vehicle Following Control

The preceding-vehicle following control is a known ordinarily executed control. In the present vehicle, the preceding-vehicle following control is executed mainly by the AC-ECU 94 of the vehicle automatic following system 16. The AC-ECU 94 determines the running speed v of the own vehicle based on the wheel rotational speeds w detected by the respective wheel speed sensors 96. Further, the AC-ECU 94 identifies a driving line on which the own vehicle will travel based on a steering angle η of the steering wheel 56 detected by the steering angle sensor 66 and the determined running speed v of the own vehicle. Moreover, the AC-ECU 94 identifies a preceding vehicle that is running on the driving line ahead of the own vehicle based on the information obtained by the radar 90 and the image information obtained by the camera 92 and identifies a distance between the preceding vehicle PV and the own vehicle OV, i.e., a following distance D, and a relative running speed v' of the own vehicle OV and the preceding vehicle PV.

Figure 3A:
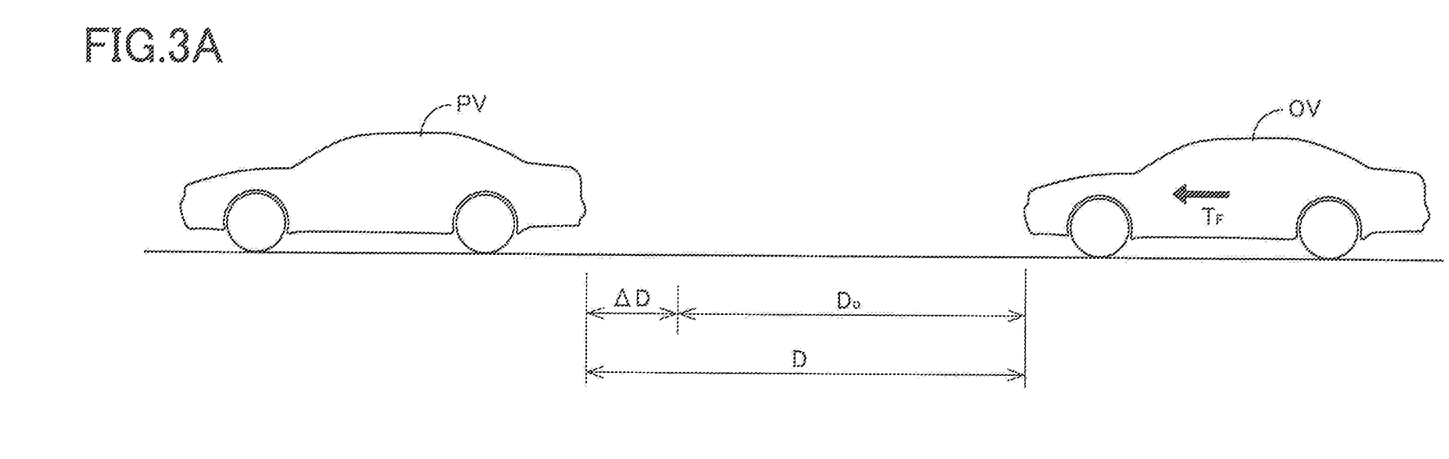
FIG. 3A is a schematic view for explaining a preceding-vehicle following control for enabling an own vehicle to follow a preceding vehicle.
Figure 3B:
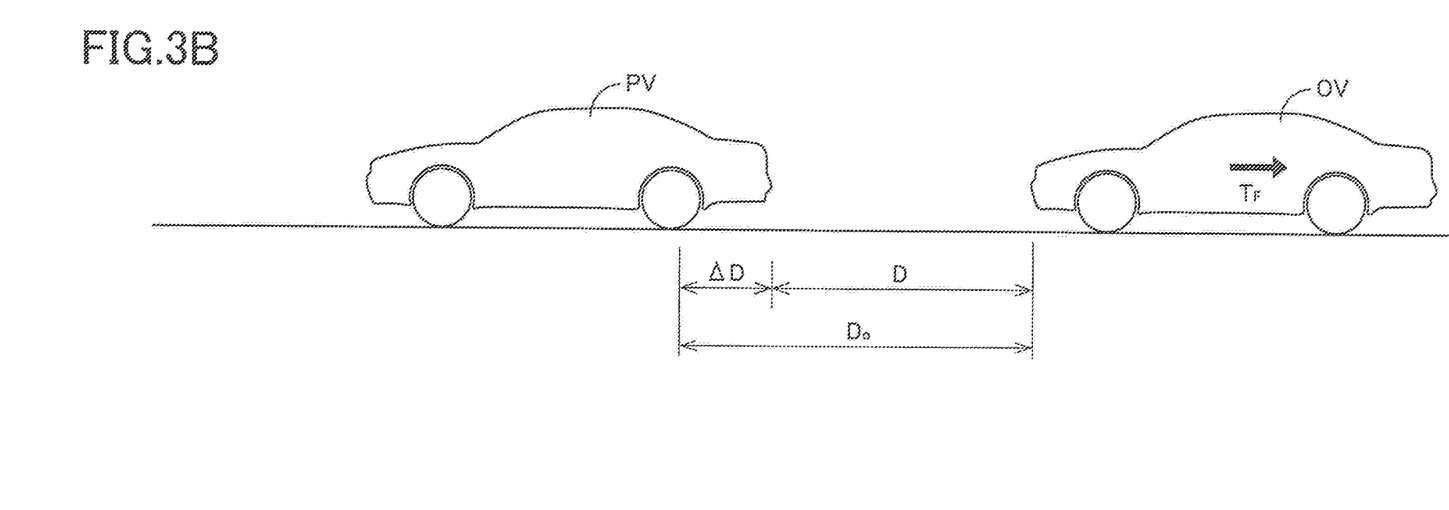
FIG. 3B is another schematic view for explaining the preceding-vehicle following control for enabling the own vehicle to follow the preceding vehicle.

The AC-ECU 94 determines a reference following distance $D_0$ as a reference of the following distance D based on an upper limit speed $v_0$ of the own vehicle OV set by the driver and the running speed v of the own vehicle OV. On condition that the running speed v of the own vehicle OV does not exceed the upper-limit speed $v_0$ of the own vehicle OV set by the driver, the AC-ECU 94 determines, as a preceding-vehicle following component $T_F$, a change amount of the drive torque based on a following distance difference ΔD that is a difference between the following distance D and the reference following distance $D_0$, so as to increase the drive force when the following distance D is larger than the reference following distance $D_0$ as illustrated in FIG. 3A or so as to decrease the drive force when the following distance D is smaller than the reference following distance $D_0$.

In this respect, the preceding-vehicle following component $T_F$ may be a value for decreasing the drive torque.

Further, the preceding-vehicle following component $T_F$ may be a value that applies the braking force to the own vehicle OV by the vehicle brake system 14 when the preceding-vehicle following component $T_F$ is a large negative value. Thus, the preceding-vehicle following control may be the control relating to the vehicle drive system 10 and may be the control relating to the vehicle brake system 14. There will be later explained as to in which one of the control of the drive force by the vehicle drive system 10 and the control of the braking force by the vehicle brake system 14 the value of the preceding-vehicle following component $T_F$ is utilized.

iv) Sharing Load Ratio Changing Control Executed in Turning

The sharing load ratio changing control executed in turning is a known ordinarily executed control. (The sharing load ratio changing control executed in turning will be hereinafter simply referred to as "sharing load ratio changing control" where appropriate.) In the present vehicle, the sharing load ratio changing control is executed mainly by the ST-ECU 64 of the vehicle steering system 12. The ST-ECU 64 identifies that the own vehicle OV is turning based on the steering angle η of the steering wheel 56 detected by the steering angle sensor 66. Specifically, the ST-ECU 64 identifies whether (A) the own vehicle OV is in an initial stage of turning as illustrated in a portion indicated by "(a)" in FIG. 4, namely, turning of the vehicle is in a stage in which the steering angle η starts increasing from the neutral state after steering has been started or (B) the own vehicle OV is in a stable stage of turning as illustrated in a portion indicated by (b) in FIG. 4, namely, the steering angle η no longer changes though it has shifted from the neutral state.

Figure 4:
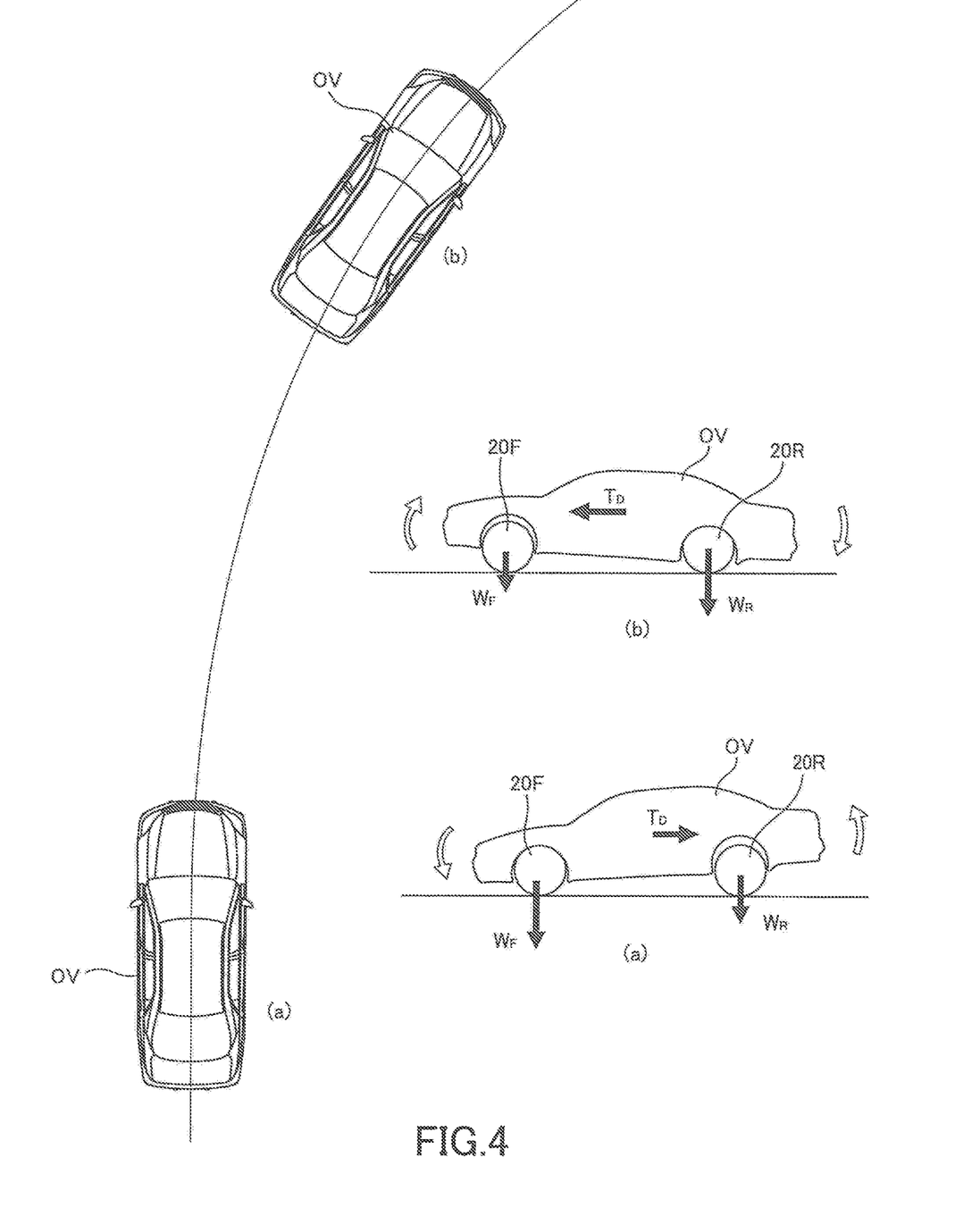
FIG. 4 is a schematic view for explaining a sharing load ratio changing control executed in turning for changing, in turning of the vehicle, a ratio between a load of a body of the vehicle shared by front wheels and a load of the body of the vehicle shared by rear wheels.

When the ST-ECU 64 identifies that the own vehicle OV is in the initial stage of turning, the ST-ECU 64 increases a load of the vehicle body shared by the front wheels 20F, i.e., a sharing load $W_F$, and decreases a load of the vehicle body shared by the rear wheels 20R, i.e., a sharing load $W_R$. Specifically, by decreasing the drive force, a sharing load ratio $W_F/W_R$ is increased while causing the vehicle to take a nose-dive posture. This achieves, in the initial stage of turning, a good response of turning, i.e., good followability of the turning behavior of the vehicle with respect to steering of the steering wheel 56. When the ST-ECU 64 identifies that the own vehicle OV is in the stable stage of turning, on the other hand, the ST-ECU 64 decreases the sharing load $W_F$ of the front wheels 20F and increases the sharing load $W_R$ of the rear wheels 20R. Specifically, by increasing the drive force, the sharing load ratio $W_F/W_R$ is decreased while causing the vehicle to take a squat posture. This enables the posture of the vehicle body to be stabilized in the midst of turning.

The ST-ECU 64 determines, as a sharing load ratio change component $T_D$, the change amount of the drive force in the sharing load ratio changing control based on the steering angle η of the steering wheel 56, an operation speed dη/dt of the steering wheel 56, and the running speed v of the own vehicle OV.

v) Determination of Drive Force to be Applied to Vehicle by Vehicle Drive Device Signals relating to the preceding-vehicle following component $T_F$ are sent from the AC-ECU 94 to the HB-ECU 44 via the CAN 100, and signals relating to the sharing load ratio change component $T_D$ are sent from the ST-ECU 64 to the HB-ECU 44 via the CAN 100. The HB-ECU 44 adds, to the basic drive torque $T_B$ determined by itself, the sprung-vibration damping component $T_V$ determined by itself, the preceding-vehicle following component $T_F$ and the sharing load ratio change component $T_D$, to thereby determine, as an application drive torque T*, an application drive force that is the drive force to be applied to the own vehicle OV by the vehicle drive device 22.

As explained above, in the case where one or more of the sprung-vibration damping component $T_V$, the preceding-vehicle following component $T_F$, and the sharing load ratio change component $T_D$ are negative components, the application drive torque T* may sometimes become a negative value. In the case where the application drive torque T* becomes a negative value, the vehicle drive device 22 generates a regenerative braking force to the extent possible.

vi) Flow Relating to Determination of Braking Force and Drive Force

The present vehicle employs the hybrid drive system. Thus, the regenerative braking force is generated by the vehicle drive device 22 with higher priority in applying the braking force to the vehicle. Further, when the value of the preceding-vehicle following component $T_F$ becomes relative large in the preceding-vehicle following control, the braking force sometimes needs to be generated by the vehicle brake system 14 as explained above. Accordingly, there will be next explained how the braking force and the drive force are determined referring to a flowchart of FIG. 5.

Figure 5:
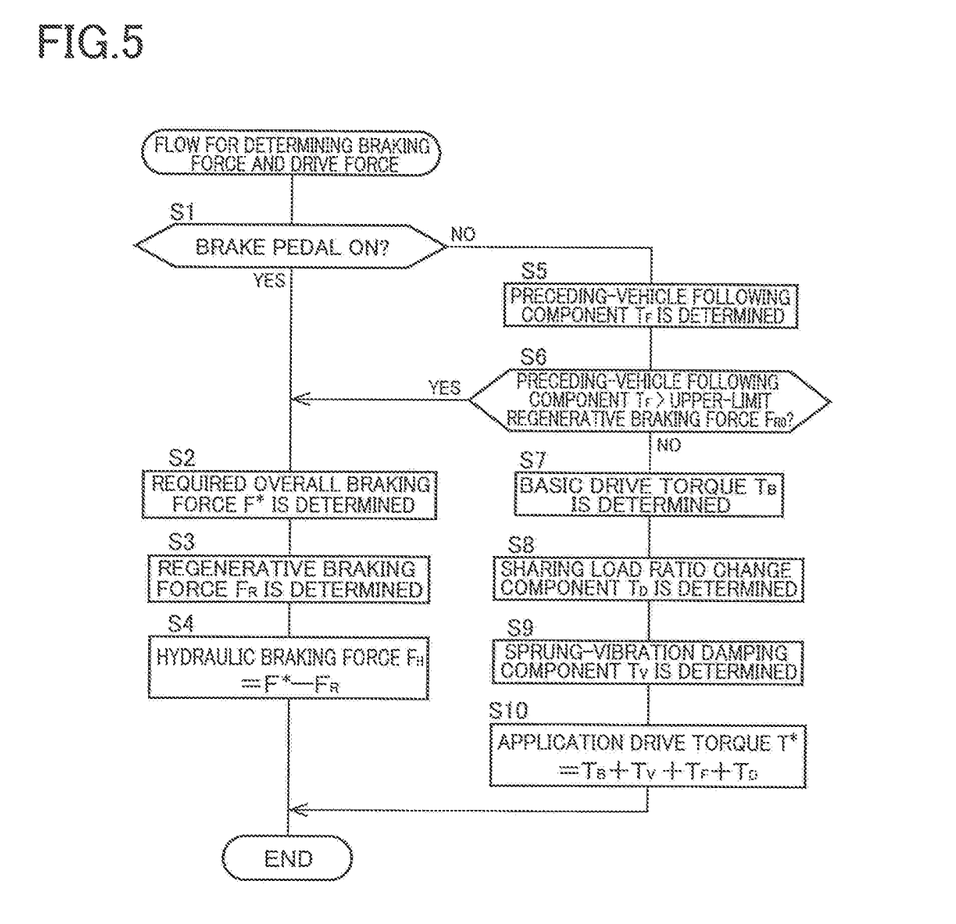
FIG. 5 is a flowchart for determining a braking force and the drive force to be applied to the vehicle on which the vehicle drive system of the embodiment is installed.

In processing according to the flowchart, the BR-ECU 84 determines at Step 1 whether the brake pedal 70 is being operated. (Step 1 is abbreviated as "S1", and other steps are similarly abbreviated.) When the brake pedal 70 is being operated, the BR-ECU 84 determines at S2 a required overall braking force F* that is the braking force required for the vehicle as whole, based on a brake operation amount σ that is the operation amount of the brake pedal 70 detected by the brake operation amount sensor 72. At S3, the BR-ECU 84 determines a regenerative braking force $F_R$ that should be generated within a range so as not to exceed an upper-limit regenerative braking force $F_{R0}$. The upper-limit regenerative braking force $F_{R0}$ is the regenerative braking force $F_R$ that can be generated at the present time. The upper-limit regenerative braking force $F_{R0}$ is determined based on the running speed v of the own vehicle, a charged amount of the battery 42, etc. At S4, the BR-ECU 84 determines a hydraulic braking force $F_H$ to be generated by subtracting, from the required overall braking force F*, the regenerative braking force $F_R$ to be generated.

The HB-ECU 44 controls the vehicle drive device 22 to generate the determined regenerative braking force $F_R$, and the BR-ECU 84 controls the brake actuator 82 of the vehicle brake system 14 to generate the determined hydraulic braking force $F_H$.

When it is determined at S1 that the brake pedal 70 is not being operated, the AC-ECU 94 determines at S5 the preceding-vehicle following component $T_F$. When it is determined at S6 that the preceding-vehicle following component $T_F$ determined at S5 is a negative value whose absolute value is larger than the upper-limit regenerative braking force $F_{R0}$, the required overall braking force F* is determined at S2 based on the preceding-vehicle following component $T_F$. Consequently, S3 and S4 are executed thereafter.

When it is determined at S6 that the preceding-vehicle following component $T_F$ is a positive value or a value smaller than the upper-limit regenerative braking force $F_{R0}$ even though it is a negative value, the HB-ECU 44 determines at S7 the basic drive torque $T_B$ based on the accelerator operation amount ζ that is the operation amount of the accelerator pedal 46 detected by the accelerator operation amount sensor 48. In this respect, the basic drive torque $T_B$ is determined to be 0 in the case where the accelerator pedal 46 is not being operated.

Subsequently, the ST-ECU 64 determines at S8 the sharing load ratio change component $T_D$, and the HB-ECU 44 determines at S9 the sprung-vibration damping component $T_V$. In the case where the sharing load ratio changing control is not executed, the sharing load ratio change component $T_D$ is determined to be 0. In the case where the sprung-vibration damping control is not executed, the sprung-vibration damping component $T_V$ is determined to be 0. At S10, the HB-ECU 44 determines the application drive torque T* by adding the sprung-vibration damping component $T_V$, the preceding-vehicle following component $T_F$, and the sharing load ratio change component $T_D$, to the basic drive torque $T_B$.

The HB-ECU 44 controls, based on the application drive torque T*, the vehicle drive device 22 to apply the application drive torque T* to the own vehicle. In the case where the application drive torque T* is a negative value, the regenerative braking force $F_R$ is generated by the vehicle drive device 22. However, the regenerative braking force $F_R$ that exceeds the upper-limit regenerative braking force $F_{R0}$ is not generated.

vii) Elimination of Influence of Second Drive Force Changing Control in First Drive Force Changing Control In executing the sprung-vibration damping control as the first drive force changing control, it is expected that execution of the preceding-vehicle following control and the sharing load ratio changing control each as the second drive force changing control adversely influences the sprung-vibration damping control. Specifically, each of the preceding-vehicle following control and the sharing load ratio changing control is for changing the drive force, and therefore the wheel rotational speeds w of the front wheels 20F are varied by the changed drive force. This makes it impossible to accurately estimate the bounce vibration and the pitch vibration of the vehicle body in the sprung-vibration damping control executed for damping the bounce vibration and the pitch vibration by estimating those vibrations based on the wheel rotational speeds w of the front wheels 20F.

For accurate estimation of the bounce vibration and the pitch vibration, the present vehicle drive system 10 is configured such that, in determining the sprung-vibration damping component $T_V$ by the HB-ECU 44, variation amounts δw of the wheel rotational speeds w of the front wheels 20F, namely, a variation amount $δw_F$ in the preceding-vehicle following control and a variation amount $δw_D$ in the sharing load ratio changing control, are estimated based on the preceding-vehicle following component $T_F$ and the sharing load ratio change component $T_D$, respectively. (Each variation amount δw will be hereinafter referred to as "variation amount δw depending on the second drive force changing control" where appropriate.) The estimated variation amounts $δw_F$, $δw_D$ are excluded from the wheel rotational speeds w of the front wheels 20F detected by the respective wheel speed sensors 96, and the sprung-vibration damping component $T_V$ in the sprung-vibration damping control is determined based on the wheel rotational speeds w of the front wheels 20F from which the estimated variation amounts $δw_F$, $δw_D$ have been excluded. The thus executed sprung-vibration damping control is appropriate.

viii) Functions of Hybrid Electronic Control Unit

Figure 6:
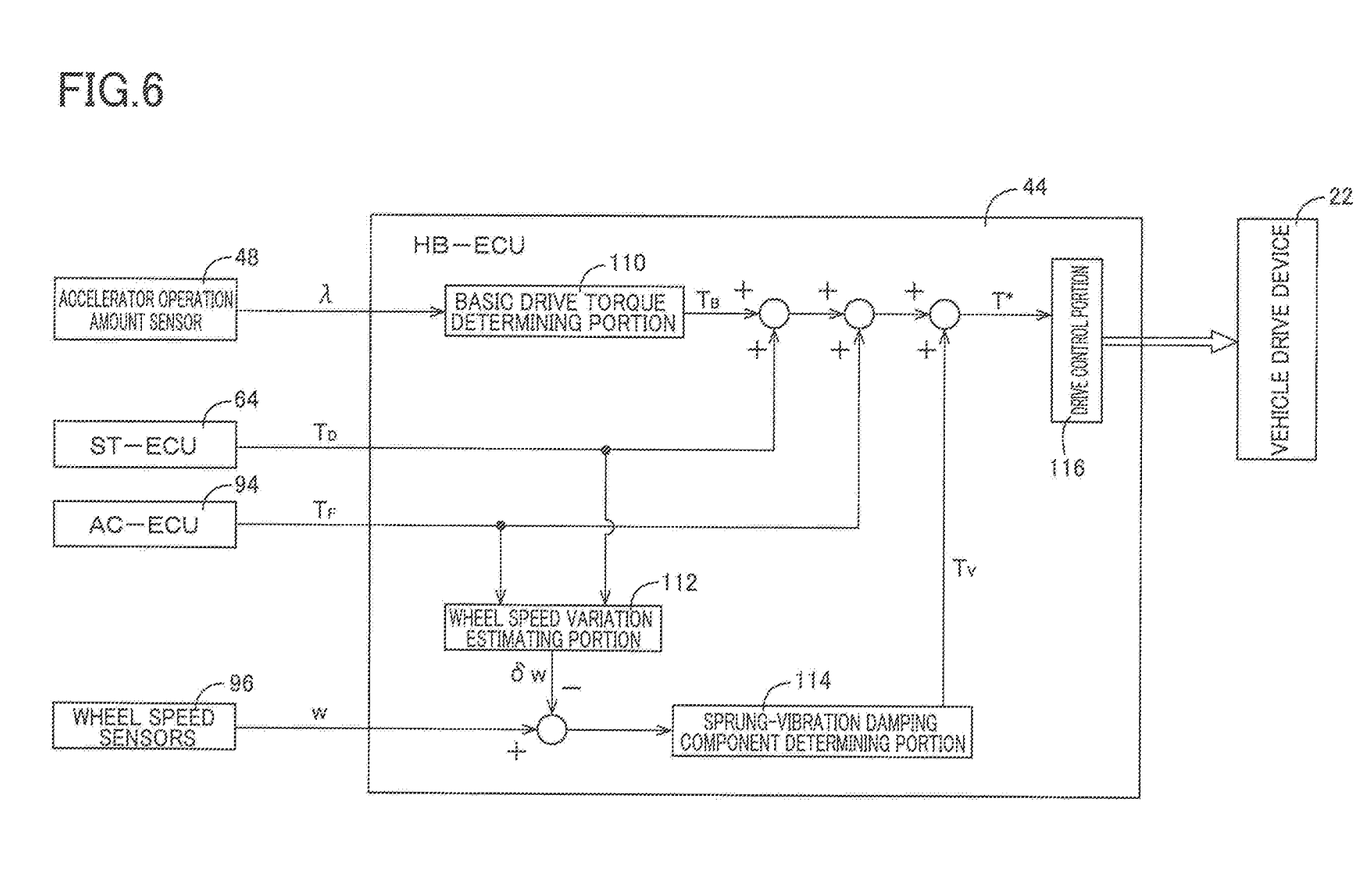
FIG. 6 is a functional block diagram for explaining functions of a hybrid electronic control unit as a controller in the vehicle drive system of the embodiment.

The HB-ECU 44 that executes the sprung-vibration damping control as described above may be regarded as having functions as illustrated in a block diagram of FIG. 6 in relation to the determination of the application drive torque T* as the drive force that should be applied to the own vehicle. Specifically, the HB-ECU 44 includes a basic drive torque determining portion 110 configured to determine the basic drive torque $T_B$ that is the drive force in accordance with the driver's request, based on the accelerator operation amount λ, that is the operation amount of the accelerator pedal 46 detected by the accelerator operation amount sensor 48.

The HB-ECU 44 further includes a wheel speed variation estimating portion 112 configured to estimate the variation amounts δw ($δw_F$, $δw_D$) depending on the second drive force changing control that are variations in the wheel rotational speeds w of the front wheels 20F, based on i) the sharing load ratio change component $T_D$ that is the change amount of the drive force determined in the sharing load ratio changing control and sent from the ST-ECU 64 and ii) the preceding-vehicle following component $T_F$ that is the change amount of the drive force determined in the preceding-vehicle following control and sent from the AC-ECU 94. To eliminate the influence of the second drive force changing control, the variation amounts δw ($δw_F$, $δw_D$) depending on the second drive force changing control estimated by the wheel speed variation estimating portion 112 are excluded from the wheel rotational speeds w of the front wheels 20F detected by the wheel speed sensors 96.

The HB-ECU 44 includes a sprung-vibration damping component determining portion 114 configured to determine, according to the process described above, the sprung-vibration damping component $T_V$ that is the change amount of the drive force in the sprung-vibration damping control, based on the wheel rotational speeds w of the front wheels 20F from which the variation amounts δw ($δw_F$, $δw_D$) depending on the second drive force changing control have been excluded.

The sharing load ratio change component $T_D$, the preceding-vehicle following component $T_F$, and the sprung-vibration damping component $T_V$ are added to the basic drive torque $T_B$, so that the application drive torque T*, which is the drive force to be applied to the own vehicle, is determined. The HB-ECU 44 includes a drive control portion 116 configured to control the vehicle drive device 22, specifically, to control the engine 24 and the inverters 40M, 40G of the vehicle drive device 22, based on the application drive torque T*.

The determination of the sharing load ratio change component $T_D$ in the sharing load ratio changing control is executed by the ST-ECU 64, and the determination of the preceding-vehicle following component $T_F$ in the preceding-vehicle following control is executed by the AC-ECU 94. Thus, in the case where it is considered that the vehicle drive system 10 executes the sharing load ratio changing control and the preceding-vehicle following control each as the second drive force changing control, the ST-ECU 64 and the AC-ECU 94 may be regarded as constituting a part of the vehicle drive system 10.

C. Modification

The vehicle drive system 10 according to the embodiment illustrated above is the hybrid drive system including the vehicle drive device 22 that utilizes the engine 24 and the electric motor 30 as the drive source. The concept that "the first drive force changing control determines the change amount of the drive force based on the wheel rotational speed from which is eliminated the variation in the wheel rotational speed caused by execution of the second drive force changing control" is applicable to a vehicle drive system including a vehicle drive device that utilizes only the engine as the drive source. In such a vehicle drive system, the negative drive force by the regenerative braking force cannot be generated.

In the embodiment illustrated above, the preceding-vehicle following control and the sharing load ratio changing control are executed each as the second drive force changing control. The vehicle drive system of the present disclosure may be configured to execute only one of the two controls as the second drive force changing control. Further, in addition to or in place of the preceding-vehicle following control and/or the sharing load ratio changing control, another control for changing the drive force to be applied to the own vehicle by the vehicle drive device may be executed as the second drive force changing control. For instance, a vehicle stability control (VSC control) and a lane trace control for enabling the own vehicle to run within a driving lane in which the own vehicle is running may be executed as the second drive force changing control. In the embodiment illustrated above, the sprung-vibration damping control is executed as the first drive force changing control. In the vehicle drive system of the present disclosure, some control may be executed as the first drive force changing control as long as the control is for changing the drive force to be applied in the basic drive force control based on the variation in the wheel rotational speeds.

What is claimed is:

1. A vehicle drive system configured to execute a) a basic drive force control in which a vehicle drive device applies, to an own vehicle, a drive force in accordance with a request of a driver, b) a first drive force changing control being a sprung-vibration damping control for changing the drive force to be applied in the basic drive force control, based on a variation in a wheel rotational speed, and c) a second drive force changing control being (i) a preceding-vehicle following control, (ii) a sharing load ratio changing control, or (iii) both the preceding-vehicle following control and the sharing load ratio changing control, for changing the drive force to be applied in the basic drive force control for a purpose different from a purpose of changing the drive force in the first drive force changing control, wherein: the first drive force changing control is configured such that a change amount of the drive force in the first drive force changing control is determined based on the wheel rotational speed from which is eliminated a variation in the wheel rotational speed caused by execution of the second drive force changing control; and the drive force to be applied to the own vehicle is a function of the drive force determined by the basic drive force control, the change amount of the drive force determined by the first drive force changing control and a change amount of the drive force determined by the second drive force changing control.

2. The vehicle drive system according to claim 1, wherein the sprung-vibration damping control damps a vibration of a body of the vehicle that arises from road input.

3. The vehicle drive system according to claim 1, wherein the preceding vehicle following control enables the own vehicle to follow the preceding vehicle running ahead of the own vehicle while a distance between the preceding vehicle and the own vehicle is kept at a set distance.

4. The vehicle drive system according to claim 1, wherein the sharing load ratio changing control changes, in turning of the own vehicle, a ratio between a load of a body of the vehicle shared by front wheels and a load of the body of the vehicle shared by rear wheels.

5. The vehicle drive system according to claim 1, wherein the vehicle drive device includes an electric motor as a drive source.

6. The vehicle drive system according to claim 1, wherein the drive force to be applied to the own vehicle is determined by adding, to the drive force determined by the basic drive force control, the change amount of the drive force determined by the first drive force changing control and the change amount of the drive force determined by the second drive force changing control.

* * * * *